US 7,428,699 B1

(12) United States Patent
Kane et al.

(10) Patent No.: US 7,428,699 B1
(45) Date of Patent: Sep. 23, 2008

(54) CONFIGURABLE REPRESENTATION OF STRUCTURED DATA

(75) Inventors: Matthew B. Kane, Agoura Hills, CA (US); Philip Levy, Los Altos, CA (US); Jeff Young, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 104 days.

(21) Appl. No.: 10/347,113

(22) Filed: Jan. 15, 2003

(51) Int. Cl.
*G06F 17/00* (2006.01)
(52) U.S. Cl. ........................... 715/236; 715/234
(58) Field of Classification Search ............ 715/514, 715/517, 513, 502
See application file for complete search history.

(56) References Cited

U.S. PATENT DOCUMENTS

| | | | | |
|---|---|---|---|---|
| 5,825,944 A * | 10/1998 | Wang | | 382/309 |
| 5,848,386 A | 12/1998 | Motoyama | | 704/5 |
| 5,915,259 A | 6/1999 | Murata | | 715/513 |
| 5,920,879 A | 7/1999 | Kyojima et al. | | 715/517 |
| 6,009,436 A | 12/1999 | Motoyama et al. | | 715/102 |
| 6,031,625 A | 2/2000 | Sherman et al. | | 358/1.18 |
| 6,298,357 B1 | 10/2001 | Wexler et al. | | 715/513 |
| 6,442,576 B1 | 8/2002 | Edelman et al. | | 715/513 |
| 6,453,312 B1 * | 9/2002 | Goiffon et al. | | 707/3 |
| 6,832,237 B1 * | 12/2004 | Christensen et al. | | 709/200 |
| 7,143,344 B2 * | 11/2006 | Parker et al. | | 715/513 |
| 2003/0020752 A1 * | 1/2003 | Santiago | | 345/764 |
| 2003/0050929 A1 * | 3/2003 | Bookman et al. | | 707/7 |
| 2003/0229543 A1 * | 12/2003 | Zimmerman et al. | | 705/26 |
| 2003/0237046 A1 * | 12/2003 | Parker et al. | | 715/513 |
| 2004/0010752 A1 * | 1/2004 | Chan et al. | | 715/513 |
| 2004/0019589 A1 * | 1/2004 | Basrur | | 707/3 |
| 2004/0060007 A1 * | 3/2004 | Gottlob et al. | | 715/513 |
| 2004/0111302 A1 * | 6/2004 | Falk et al. | | 705/4 |
| 2004/0167883 A1 * | 8/2004 | Wakefield et al. | | 707/3 |
| 2004/0205577 A1 * | 10/2004 | Abe et al. | | 715/513 |
| 2006/0265689 A1 * | 11/2006 | Kuznetsov et al. | | 717/117 |

FOREIGN PATENT DOCUMENTS

GB      2307571 A      5/1997

OTHER PUBLICATIONS

Wang, et al. "Discovering Typical Structures of Documents: a Road Map Approach", Proceedings of the 21st Annual International ACM SIGIR Conference on Research and Development in Information Retrieval, 1998, Melbourne, Australia pp. 146-154.

(Continued)

*Primary Examiner*—Stephen Hong
*Assistant Examiner*—Adam M Queler
(74) *Attorney, Agent, or Firm*—Fish & Richardson P.C.

(57) ABSTRACT

Methods and apparatus, including computer program products, implement techniques for accessing elements of structured source data. Sample data that is capable of being represented as a hierarchy of elements is received. A graphical representation of the hierarchy of elements is presented. User input is received selecting one or more elements in the graphical representation of the hierarchy of elements. A template structure is defined based on the selected elements. Source data is accessed according to the template structure.

54 Claims, 4 Drawing Sheets

OTHER PUBLICATIONS

"Applying Nested Styles to a Paragraph, Nested Style Character Style Options" Adobe Systems Incorporated, InDesign CS Help, 2005, 4 pages.

Ossanna, et al. "TROFF User's Manual", AT&T Bell Labs, Nov. 1992, 37 pages.

"XSL Transformations (XSLT) Version 2.0, WC3 Working Draft Apr. 4, 2005", WC3, 374 pages http://www.w3.org/TR/2005/WD-xslt20-20050404/.

* cited by examiner

CONFIGURABLE REPRESENTATION OF STRUCTURED DATA

BACKGROUND OF THE INVENTION

The present invention relates to representing and processing structured documents.

The Internet is a global network that uses a common communication protocol, the Transfer Control Protocol/Internet Protocol ("TCP/IP"), to transmit data from one computer to another. In order to use the transmitted data, computer applications adopt communication standards. For example, the World Wide Web ("Web") is a system that includes applications supporting Hyper Text Markup Language ("HTML") documents.

An HTML document includes content, e.g., text, and corresponding instructions, typically about how to format the content (i.e., the document is "marked up" with formatting instructions). To include an instruction, a tag is added in the document. The tag has a name that can be used to identify the corresponding instruction, and identifiers that mark the content for which the tag applies. For example, the tag can have opening and closing elements that bracket the marked content in the document. The marked content can include one or more additional tags, called child tags. Child tags can include their own children to form a hierarchical structure of the tags.

In markup languages such as Standard Generalized Markup Language ("SGML") and eXtensible Markup Language ("XML"), generalized tags can also be used to represent structure (and not just formatting) in the content of an electronic document (and, more generally, in any type of text data). For example, a generalized <name> tag can be used to mark up all names in a document, and optionally a separate file, e.g., in eXtensible Stylesheet Language ("XSL"), can describe how tagged names should be formatted. A definition file can be used to specify the generalized tags and their relations to each other, e.g., by using Document Type Definition ("DTD") or XML Schema languages. For example, a definition file can specify what are the allowed tags, which tags can have children, or how many and what type of children a particular tag can have. The generalized markup language document becomes self descriptive when combined with the corresponding definition file.

SUMMARY OF THE INVENTION

A graphical structure editor provides for user-configurable access to elements of source data based on interactive selection of elements of a sample hierarchy. In general, in one aspect, the invention provides methods and apparatus, including computer program products, implementing techniques for accessing elements of source data. The techniques include receiving sample data that is capable of being represented as a hierarchy of elements, presenting a graphical representation of the hierarchy of elements, receiving user input selecting one or more elements in the graphical representation of the hierarchy of elements, defining a template structure based on the selected elements, and accessing source data according to the template structure.

Particular implementations can include one or more of the following features. The sample data can be examined to define the hierarchy of elements, and a graphical representation of the defined hierarchy of elements can be presented to a user. Roles in the template structure can be specified for one or more selected elements. Selected element can be identified as representing a single item of data or a set of data in the template structure. Roles can be specified by selecting a control element associated with the selected element. A control element can be selected to specify that source data corresponding to the selected element will be accessed as unstructured data. Selection parameters can be specified for selected elements, and the source data can be accessed according to the selection parameters. Elements can be identified as elements to be included in or excluded from the template structure, and the template structure can be defined accordingly. Accessing source data can include generating a representation of the source data according to the template structure. The representation of the source data can include a subset of the source data defined according to the template structure. An electronic document can be generated incorporating the source data accessed according to the template structure. The sample data can include a plurality of elements having associated tags, and the graphical representation of the hierarchy of elements can include a representation of a hierarchy of tags associated with the elements. The sample data and the source data can each include a plurality of elements associated with a common set of tags. The template structure can be defined based on one or more selected tags included in the common set tags. Accessing the source data according to the template structure can include accessing one or more source data elements associated with the selected tags of the common set of tags.

In general, in another aspect, the invention provides methods and apparatus, including computer program products, implementing techniques for accessing elements of source data. The techniques include receiving user input identifying sample data that includes a plurality of elements associated with tags in a set of tags and is representable as a hierarchy of tags in the set of tags; presenting a graphical representation of the hierarchy of tags; receiving user input selecting one or more tags in the graphical representation of the hierarchy of tags; generating a template structure based on the selected tags; receiving user input identifying source data that including one or more elements associated with one or more tags in the set of tags; and presenting a representation of the source data according to the template structure. The representation includes one or more elements of the source data associated with tags of the selected tags.

The invention can be implemented to realize one or more of the following advantages. Users can select and access content in a structured source document according to a specified sample structure by using a graphical user interface ("GUI"). The content can be accessed without inspecting complex text documents, such as XML files. The GUI can present a comprehensive tree structure that corresponds to a hierarchical structure of sample data. The tree structure can include nodes and leaves corresponding to elements, e.g., tags, in the sample data. The tree structure can be displayed in a graphical representation that is expandable or collapsible to present or hide structural elements in the tree. Elements in the tree structure can be graphically selected according to the user's interest, and the user or an application can access and use elements of source data corresponding to the selected elements for further processing. For example, source data elements associated with selected tags can be presented, or extraneous source data elements can be hidden in a structured document according to the user's interest. The structure sample can represent a tagged hierarchy corresponding to the structure of the source data, or other data, such as similarly structured data. For example, the structure sample can be a DTD or an XML Schema.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
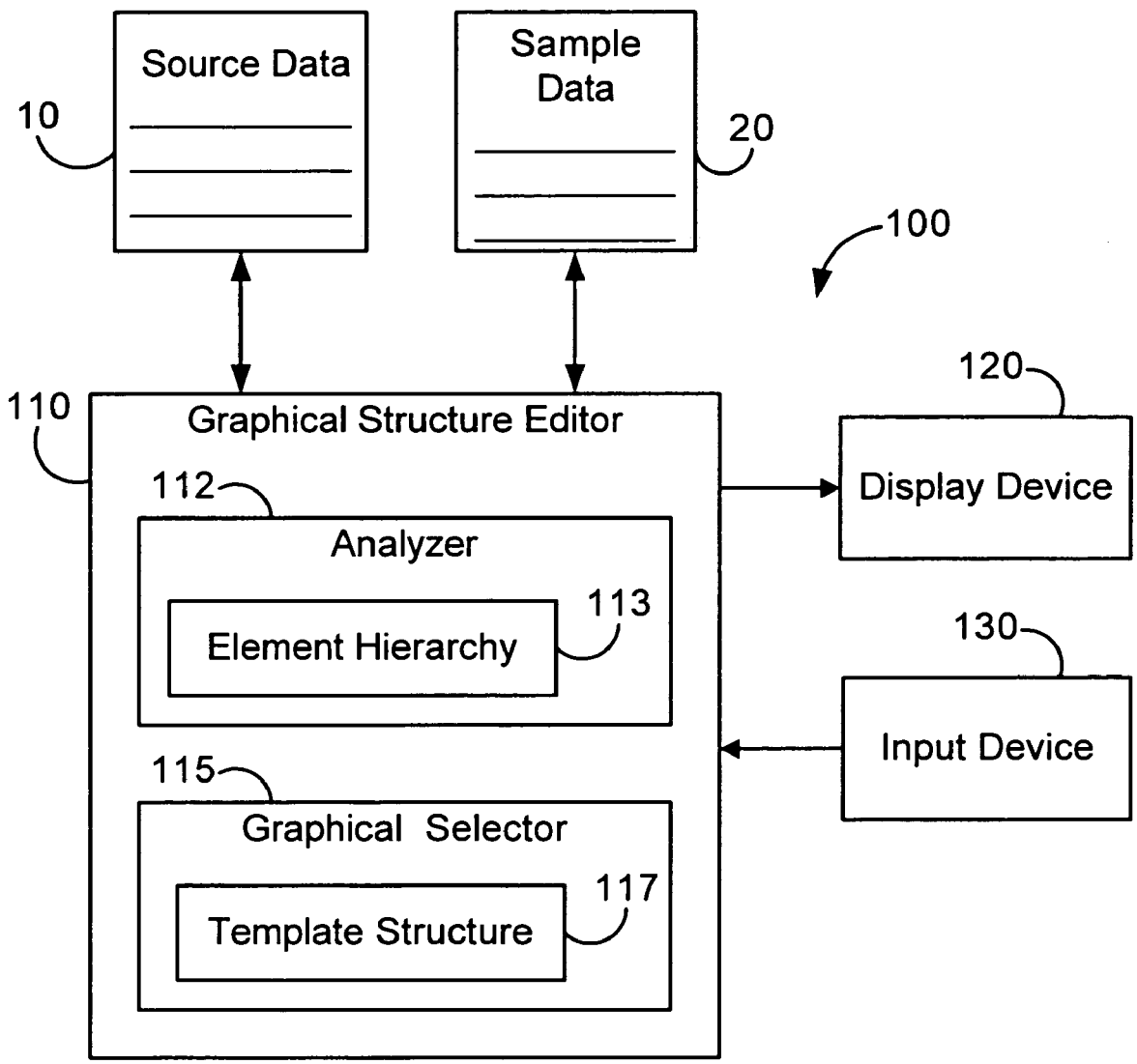
FIG. 1 is a schematic diagram showing a system for accessing and using content in structured data according to one aspect of the invention.

FIG. 1 illustrates one implementation of a system 100 according to one aspect of the invention that is operable to select and access elements of structured source data 10 according to a template structure derived from sample data 20. The source data 10 and sample data 20 is data that can be represented as a hierarchy of elements, such as data that includes a plurality of structural and/or semantic subunits occupying relative locations in a hierarchical structure. The hierarchical structure of the data can be defined explicitly, such as by tags associated with the various elements that classify their associated elements according to the element's structural, semantic, or other role in the data. For example, the source data 10 and/or sample data 20 can be a hierarchically structured markup language document, such as a HTML, SGML, or XML document. Alternatively, the hierarchical structure of the data can be defined implicitly, such as where the source data 10 is a Portable Document Format ("PDF") document that does not explicitly include tags, but has a hierarchical structure that can be represented by tags.

The system 100 includes a graphical structure editor 110, a display device 120, and an input device 130. The graphical structure editor 110 identifies a hierarchical structure of sample data 20. The sample data 20 is data that can be represented as a hierarchy of elements. The sample data 20 can be the same as the source data 10 or different from the source data 10. In general, the sample data 20 will have a structure that is similar (in whole or in part) to that of the source data 10, or that is expected to be similar to the structure of source data to be processed using the system 100. Using the graphical structure editor 110 in a graphical user interface ("GUI"), a user can select one or more elements in the identified structure and access elements of the source data 10 corresponding to the selected elements. The GUI is displayed to the user on the display device 120, and input from the user is received through the input device 130. The graphical structure editor 110 can transmit the selected elements of the source document 10 to a document generator, or to any other application, for further processing, such as incorporation into a structured document.

The graphical structure editor 110 includes an analyzer 112 and a graphical selector 115. The analyzer 112 examines the sample data 20 to identify a hierarchy of elements 113 that represents the structure of the sample data 20. The graphical selector 115 can display a representation of the hierarchy of elements 113 to a user and receive user input selecting elements in the hierarchy. From the selected elements, the graphical selector 115 defines a template structure 117 that can be used to access corresponding content in the source data 10.

Figure 2:
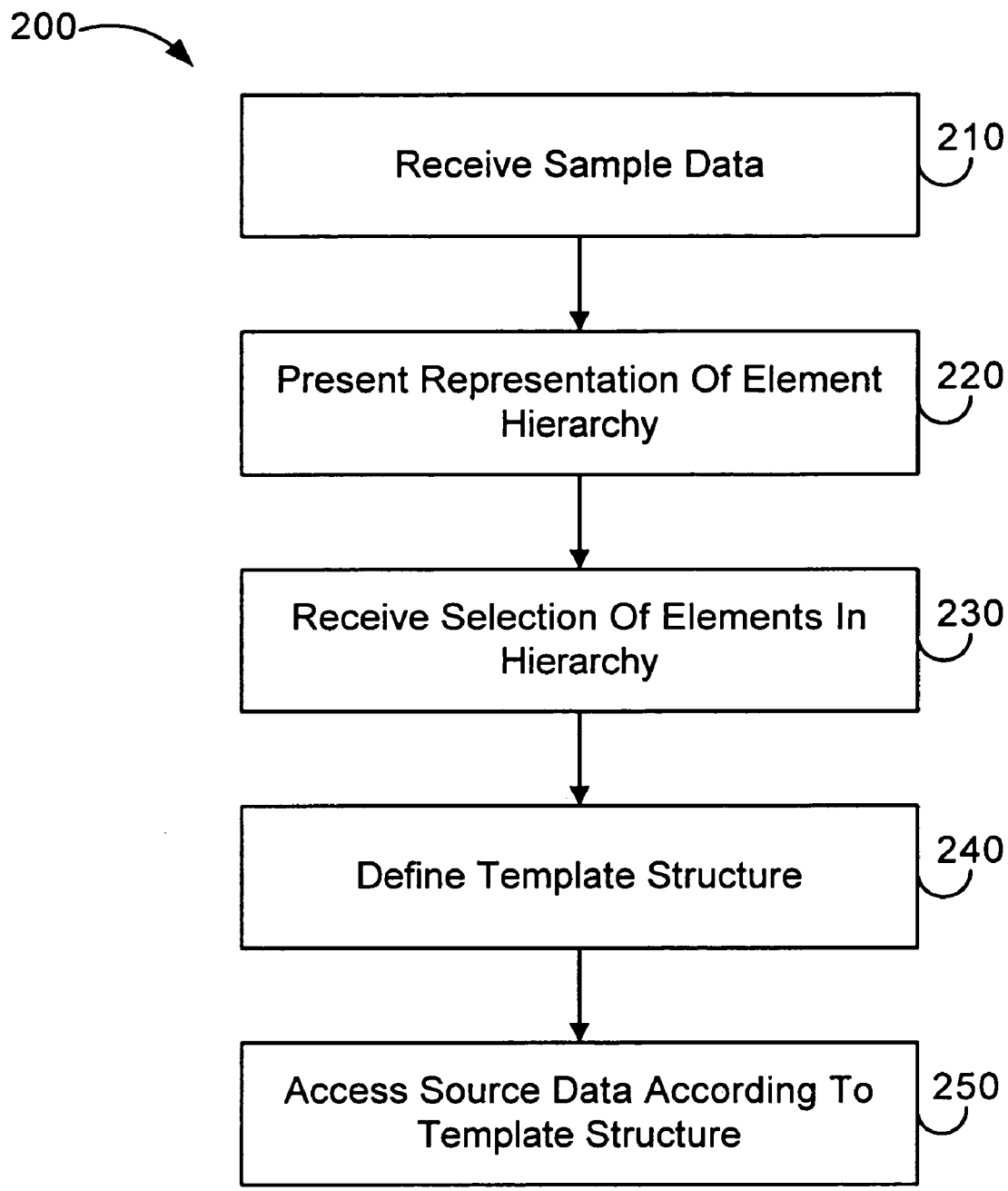
FIGS. 2 and 3 are flow diagrams showing methods for accessing content in structured data according to one aspect of the invention.

FIG. 2 illustrates a method 200 for accessing elements of source data 10, according to one aspect of the invention. The method 200 can be performed, e.g., using a system 100 including the graphical structure editor 110. The method begins when the system receives sample data that can be represented as a hierarchy of elements (step 210). The sample data can be, for example, a structured sample document in HTML, SGML, XML or tagged Adobe® PDF format, in which elements of the sample data are associated with tags that define the logical structure of the data (e.g., a tag hierarchy). Alternatively, the sample data can be a structured document in a format, such as Adobe® PDF, in which logical structure is not represented by tagging. In still another alternative, the sample data can be a structural representation of a structured document in the form of a definition file, such as a DTD or XML Schema that expressly defines a hierarchy of elements.

The sample data can be received from a local data source or over a network such as the Internet. The graphical structure editor can request the sample data—for example, in response to user input identifying the sample data for use in accessing source data. Thus, for example, the user can specify a file name or a URL that identifies the sample data, and the graphical source editor can request the specified sample data from a file server, e.g., a web server. Optionally, where the sample data is a web document, the graphical structure editor can request a web server to parse the web document using server side scripting technology such as Active Server Pages ("ASP"), Java Server Pages ("JSP"), and Hypertext Preprocessor ("PHP"), and the web server can transmit the result of parsing, e.g., in XML format, to the graphical structure editor.

The system presents a representation of a hierarchy of elements of the sample data (step 220). The hierarchy of elements can be represented as a tree structure—i.e., a hierarchy of nodes and leaves. A node, also called a parent, has at least one child; a leaf has no child. A child is a node or leaf representing an element that is below the parent in the hierarchy and has an immediate relation to the parent. The relation between the parent and one or more children can be represented as branches of the tree structure.

In one implementation, the system 100 (e.g., analyzer 112) defines the hierarchy of elements by examining the sample data. Where the sample data explicitly defines the hierarchy, as in a tagged markup language document, the system can identify a hierarchy of elements corresponding directly to the tags in the document. The system can parse the document to identify tags and to identify the hierarchical relationships between identified tags. The system uses the identified tags and relationships to define the hierarchy, such that tags in the document correspond to nodes and leaves in the tree structure, with tags having one or more child tags being treated as nodes, the child tags as the children of the node, and tags without any child tag as leaves. Where the sample data does not explicitly include tags, a tagged representation of the sample data can be generated by extracting structure information from the sample data and associating tags with the data based on the extracted structure information using known techniques, such as those disclosed in U.S. Pat. No. 6,298,357 and U.S. patent application Ser. No. 09/266,680, filed on Mar. 11, 1999, which are incorporated by reference herein. Alternatively, where the sample data includes a predefined hierarchy of elements, such as a DTD or schema, the system can present a representation of that hierarchy without examining individual elements of the sample data.

The system can present a representation that is simpler than the tagged hierarchy defined in the sample data. For example, if a tag has multiple children carrying the same tag, the system can simplify the hierarchy by including only one of the multiple children in the representation. Furthermore, the system can disregard tags, such as certain formatting tags, that have no structural relevance for identifying the hierarchy of elements.

The system can also be configured to present a representation that is more complete in some aspect than a tagged hierarchy that is defined in the sample data. For example, the tagged hierarchy may include a tag that appears at multiple positions in the hierarchy and has different children at different positions. Such children can be united by the analyzer so that the representation of the hierarchy will include all possible children of the tag. For example, if a node <client> has only a first child—e.g., <name>—at one position of the tagged hierarchy, and only a second child—e.g., <phone>—at another position, the representation can include both children, i.e., <name> and <phone>, at each occurrence of the node <client>.

In one implementation, the system can insert nodes or leaves to the tree structure, e.g., based on user input. The inserted nodes or leaves can be, e.g., tags that have been disregarded by the system in constructing the tree structure. Alternatively, the inserted nodes or leaves can be elements that do not occur in the sample data, but that are expected to be included in the source data, or can be containers without content for integrating a subset of the elements in the hierarchy. In one implementation, the system can insert optional elements that can be activated to switch between alternative tree structures for the same sample data.

The system receives a selection of elements in the graphical representation of the hierarchy of elements (step 230). The elements can be selected by a user in a graphical user interface. Optionally, for each selected element, the user can specify one or more selection parameters to indicate how the selection can be applied to access content in corresponding elements of source data. For example, the user can specify a selection parameter to indicate that the selected element(s) will be included in or excluded from a template structure (described below) that can be used to access source data. Similarly, a selection parameter can specify how source data elements can be accessed if multiple children of the same parent carry a selected tag (e.g., <name> tags in a list of names). Selection parameters can also indicate that particular elements of the source data can be accessed only in children of a selected element and the content in the selected element itself will not be accessed. The graphical selection is discussed in more detail with reference to FIG. 3, and an exemplary GUI for the selection is shown in FIG. 4.

The system defines a template structure based on the selected elements (step 240). The template structure defines a view that can be applied to access elements of appropriately structured source data, as will be described in more detail below. The template structure incorporates the selected elements and any associated selection parameters. Thus, for example, in one implementation the template structure includes only elements of the sample hierarchy that are selected to be included in the template structure (i.e., where the selection parameters for the selected element specify that the element is to be included). The system can also be configured to include all elements of the sample hierarchy except for elements specifically selected for exclusion (i.e., where the selection parameters identify the element as one to be excluded).

The template structure can be implemented as a set of selection records that identify the selected elements in the hierarchy and, for each selected element, specify an access path and any corresponding selection parameters. The access path can include a sequence of elements, e.g., tags, through which the selected element can be accessed in a corresponding hierarchy of the source data. The selection parameters specify how content can be accessed in the selected element—for example, specifying that data corresponding to the selected element can or cannot be accessed in the source data.

The system accesses elements of the source data based on the template structure (step 250). In one implementation, the system examines the source data to identify elements corresponding to the elements defined for the template structure, and accesses those elements, optionally according to any specified selection parameters. Where the source data is tagged structured data, the system can examine the source data by parsing the tags associated with elements of the source data to identify elements associated with tags that are included in the template structure. Where the source data does not include a tagged hierarchy representing the logical structure of the data, a tagged hierarchy can be generated by extracting structural information from the source data as described above.

Thus, for example, in the implementation described above where the template structure is defined by a set of selection records, for each selected element, the system follows the specified access path to find any corresponding elements in the source document. If a corresponding element is found in the source data, the system can access the corresponding element, optionally according to the selection parameters specified for the selected element (e.g., accessing any elements corresponding to elements whose selection parameters identify the element as one to be included in the template structure, ignoring any elements having selection parameters identifying the element as one to be excluded, etc.). If no selection parameter is specified, the system can use a default access method, such as accessing only the source data element corresponding to the selected element.

If more than one corresponding element is found by following the access path in the source data, the selection parameters can be used to determine how to access the found elements. Alternatively, the system can prompt a user to select from the found elements. If no corresponding element is found in the source data, the system can ignore the selected element, or return a message indicating that the selected element is not found. Optionally, an error message can request user input for indicating instructions to handle any missing elements.

In one implementation, a representation of the template structure is presented to a user. The representation of the template structure can include only those elements selected for inclusion, as described above. The user can further simplify the template structure by further selecting from the included elements a subset of elements that will be used to access corresponding elements of the source data. The representation of the template structure can be significantly simpler than the representation of the hierarchy in the sample data.

In one implementation, the system incorporates the accessed elements into a representation of the source data based on the template structure (e.g., according to a user's selection)—that is, a representation that includes and/or excludes elements of the source data based on the template structure. The system can incorporate one or more of the accessed elements into a document having a hierarchy of elements corresponding to the template structure. The document can be a structured document that has the same or a different structure than the source document. For example, the document can incorporate the accessed elements in a non-hierarchical structure, or the document can lack any specific structure at all.

Figure 3:
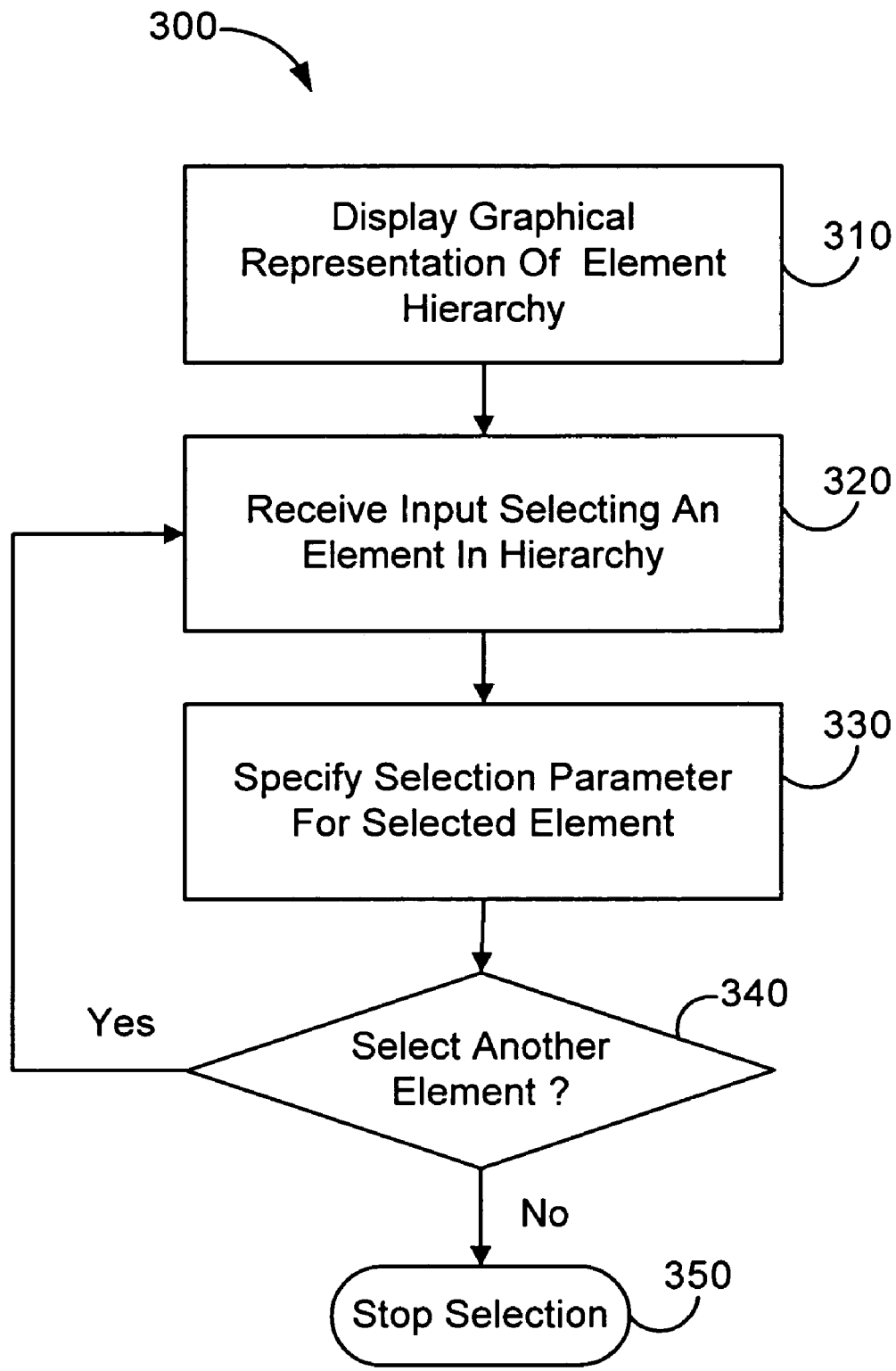
Figure 4:
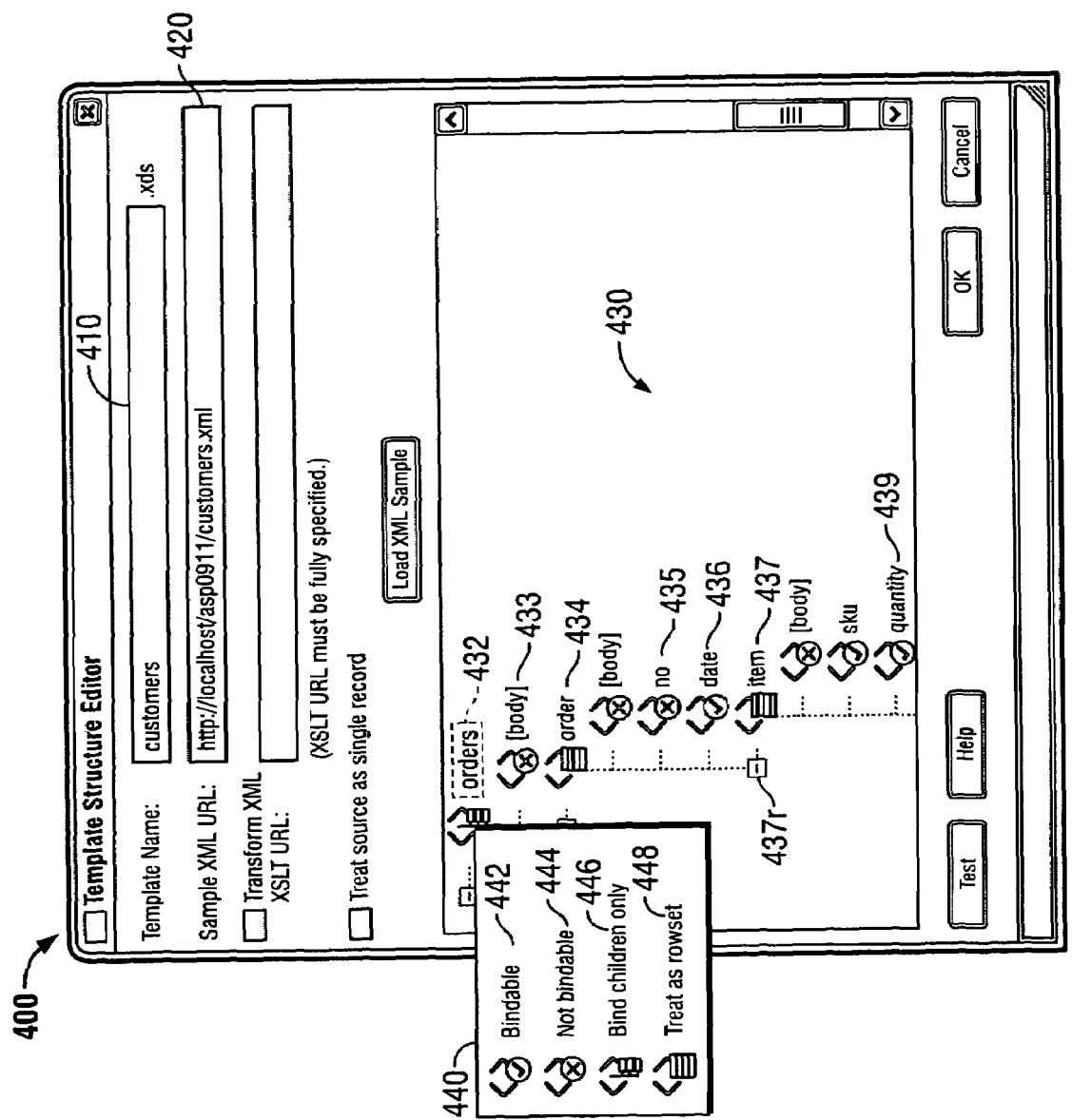
FIG. 4 is showing an exemplary graphical user interface for accessing content in structured data.

FIG. 3 shows a selecting process 300 for graphically selecting elements in a hierarchy of elements of sample data. The system displays one or more graphical representations of the hierarchy of elements (step 310). The graphical representations can be part of a GUI through which a user can interact with the system. One example of such a GUI is shown in FIG. 4. In one implementation, the graphical representation is expandable and collapsible to present and hide, respectively, structural elements in the hierarchy. For example, the user can change the graphical representation any time during the selecting process by selecting a portion of the graphical representation with a pointing device included in the input device 130.

An element of the hierarchy is selected (step 320) and a selection parameter for the selected element is specified (step 330). The element can be selected by the user through the GUI, for example, by using the pointing device and selecting the element in question. To specify selection parameters, the user can select items from a parameter menu that includes available choices for selection parameters. The parameter menu can appear automatically when the element is selected or can be shown to the user on request. Optionally, the system can be configured to provide default values for the selection parameters.

In one implementation (corresponding to the GUI shown in FIG. 4), the user can specify one of four selection parameters by using a parameter menu. The first selection parameter indicates that the selected element is "bindable". A bindable element includes content in which the user is interested, i.e., a user of the template structure can choose to "bind", i.e., access the content. The second selection parameter indicates that the selected element is "not-bindable". A not-bindable element does not include content in which the user is interested, i.e., the content of such element, including children of the element, cannot be accessed according to the template structure. The third selection parameter indicates that a user of the template structure can access only content in the children of the selected element, but not the content of the selected element itself. The fourth selection parameter indicates that the selected element can be treated as a "rowset"—that is, if the selected element appears in the source document multiple times as a child of the same parent, content can be retrieved from each child. In other words, the selected element can be iterated over multiple times during accessing content in the source document.

Alternatively, or in addition, the system can be configured to provide one or more other or additional selection parameters. For example, the user can be allowed to specify a limited number of iterations for rowset elements. Optionally, the user can also select a specific starting point or inverse direction for iterating over a rowset element. Furthermore, a selection parameter can specify if source data corresponding to a selected element can be accessed as structured or unstructured data.

In one implementation, the system can specify one or more selection parameters by using control elements associated with one or more structural elements in the tree structure. The control elements can be inserted in the tree structure and selected to specify a selection parameter for the associated structural elements. For example, as shown in FIG. 4, a [body] element can be associated with each node in the tree structure. For each node, the [body] element can be selected to include or omit structural information when accessing source data corresponding to the node. For example, if the [body] element is selected as "not-bindable", source data can be accessed as data structured according to the children of the node; if the [body] element is selected as "bindable", source data can be accessed without structuring according to the children (optionally, it can or cannot be structured according to grandchildren of the node).

The user can select another element ("Yes" branch of decision 340). Any number of elements can be selected by repeatedly selecting elements and specifying corresponding selection parameters (steps 320 and 330). Optionally, the user can change a previous selection by selecting the same element again. Once the user is satisfied with the selection ("No" branch of decision 340), the selecting process 300 stops (step 350).

FIG. 4 shows an exemplary GUI 400 that can be provided in system 100 to receive user input for selecting elements of structured sample data. The GUI 400 includes a "Template Name" field 410 for receiving user input identifying a template structure to be edited, and a "Sample XML URL" field 420 for receiving user input identifying sample data by a URL. A graphical representation 430 of a hierarchy of elements of the sample data (derived, e.g., from an examination of the sample data as described above) is presented in a window. Elements of the hierarchy, such as nodes and leaves 432-439, can be selected in the graphical representation using a pointing device. For each selected element, a selection parameter can be specified using a parameter menu 440.

In the example shown in FIG. 4, the sample data hierarchy is represented as a tree structure that includes nodes and leaves that correspond to tags in an XML document identified in the Sample XML URL field 420. The sample data includes an <orders> tag that is represented by an 'orders' node 432. The 'orders' node 432 includes an 'order' node 434 that corresponds to one or more <order> tags in the sample data. Each <order> tag can have child tags: a <no> tag corresponding to an order number and represented by a 'no' leaf 435; a <date> tag represented by a 'date' leaf 436; and one or more <item> tags represented by a single 'item' node 437. Each <item> tag can be a parent and have child tags, such as a <quantity> tag represented by a 'quantity' leaf 439.

In the graphical representation 430, each element, i.e., a node or a leaf, has a corresponding icon, and the hierarchical relations between the structural elements are represented by corresponding lines. In one implementation, an element can be selected by selecting the corresponding icon with a pointing device. For each element, the corresponding icon indicates a selection parameter from the parameter menu 440. The selection parameter can be set, for example, by "right clicking" on the corresponding symbol and choosing an entry from a pop-up parameter menu 440. Furthermore, each node has an associated collapse indicator, e.g. collapse indicator 437r for 'item' node 437, that indicates if children of the node are shown ("−") or hidden ("+") in the graphical representation 430. By selecting a collapse indicator with the pointing device, the children of the associated node can be shown or hidden.

The parameter menu 440 includes entries for setting selection parameters to control access of content in the selected elements. The parameter menu 440 includes four entries: Bindable, Not bindable, Bind children only, and Treat as a rowset. The corresponding selection parameters are discussed above with reference to FIG. 3.

The invention can be implemented in digital electronic circuitry, or in computer hardware, firmware, software, or in combinations of them. The invention can be implemented as a computer program product, i.e., a computer program tangibly embodied in an information carrier, e.g., in a machinereadable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A computer-implemented method, comprising:
   receiving sample data having a hierarchical structure;
   presenting to a user a graphical representation of a sample hierarchy of elements, the sample hierarchy representing the hierarchical structure of the sample data;
   receiving input from the user selecting two or more elements from the graphical representation to identify two or more selected elements from the sample hierarchy, the two or more elements being a subset of the elements in the sample hierarchy and where selecting an element includes displaying a parameter menu having a plurality of selection parameters and receiving input from the user selecting one or more of the selection parameters to associate with the selected element, the plurality of selection parameters including at least a bindable parameter and a non-bindable parameter;
   defining a template structure that identifies the two or more selected elements from the sample hierarchy and identifying a corresponding access path for each identified element; and
   using the template structure to access source data having a hierarchical structure corresponding to the sample hierarchy, and where the template structure defines a view of the source data corresponding to the selected elements and their associated selected elements.

2. The method of claim 1, wherein presenting a graphical representation of the hierarchy of elements includes:
   examining the sample data to define the hierarchy of elements; and
   presenting a graphical representation of the defined hierarchy of elements to a user.

3. The method of claim 1, where displaying the parameter menu further comprises displaying a bind children only parameter and a treat as rowset parameter.

4. The method of claim 3, where receiving input selecting the bind children only parameter indicates that content associated with children of the element is accessible using the template structure while content associated with the element is not accessible.

5. The method of claim 3, where receiving input selecting the treat as rowset parameter indicates that the element is treated as a rowset such that when the element occurs in the source data multiple times as a child of a same parent, then content associated with each child is accessible using the template structure.

6. The method of claim 1, where receiving input selecting the non-bindable parameter indicates that content associated with the element is not accessible using the template structure.

7. The method of claim 1, where displaying the parameter menu further comprises displaying a parameter specifying whether content corresponding to the selected element is accessed as structured or unstructured data.

8. The method of claim 1, wherein:
   receiving user input selecting two or more selected elements includes receiving user input specifying a selection parameter for a selected element; and accessing source data includes accessing source data according to the selection parameter.

9. The method of claim 1, wherein:
receiving user input selecting two or more selected elements includes receiving user input identifying elements to be included in the template structure; and
defining a template structure includes defining a template structure including the identified elements.

10. The method of claim 1, wherein:
receiving user input selecting two or more selected elements includes receiving user input identifying one or more elements to be excluded from the template structure; and
defining a template structure includes defining a template structure excluding the identified elements.

11. The method of claim 1, further comprising:
generating a representation of the source data according to the template structure.

12. The method of claim 11, wherein:
the representation of the source data includes a subset of the source data, the subset being defined according to the template structure.

13. The method of claim 1, further comprising:
generating an electronic document incorporating the source data accessed according to the template structure.

14. The method of claim 1, wherein:
the sample data includes a plurality of elements having associated tags; and
the graphical representation of the hierarchy of elements includes a representation of a hierarchy of tags associated with the elements.

15. The method of claim 1, where presenting a graphical representation of the sample hierarchy of elements includes displaying one or more elements that do not occur in the sample data, but are expected to occur in the source data.

16. The method of claim 1, where presenting a graphical representation of the sample hierarchy of elements includes displaying one or more elements that are containers without content for integrating a subset of elements in the hierarchy.

17. The method of claim 1, where presenting a graphical representation of the sample hierarchy of elements includes inserting optional elements that can be activated to switch between alternative sample hierarchies for the same sample data.

18. A computer-implemented method, comprising:
receiving user input identifying sample data, the sample data including a plurality of elements associated with tags in a set of tags;
obtaining from the sample data a hierarchy of tags;
presenting to a user a graphical representation of a sample hierarchy of tags, the sample hierarchy representing the hierarchical structure of tags of the sample data;
receiving input from the user selecting two or more tags from the graphical representation to identify two or more selected tags from the sample hierarchy, the two or more tags being a subset of the sample hierarchy of tags and where selecting a tag includes displaying a parameter menu having a plurality of selection parameters and receiving input from the user selecting one or more of the selection parameters to associate with the selected tag, the plurality of selection parameters including at least a bindable parameter and a non-bindable parameter;
generating a template structure that identifies the two or more selected tags from the sample hierarchy of tags and identifying a corresponding access path for each identified tag;

receiving user input identifying source data, the source data including elements associated with a hierarchical structure of tags corresponding to the sample hierarchy of tags; and
presenting a view of the source data according to the template structure, the view including one or more elements of the source data associated with tags corresponding to tags of the template structure and their associated selected elements.

19. A computer program product, tangibly embodied in an information carrier, comprising instructions operable to cause data processing apparatus to:
receive sample data having a hierarchical structure;
present to a user a graphical representation of a sample hierarchy of elements, the sample hierarchy representing the hierarchical structure of the sample data;
receive input from the user selecting two or more elements from the graphical representation to identify two or more selected elements from the sample hierarchy, the two or more elements being a subset of the sample hierarchy and where selecting an element includes displaying a parameter menu having a plurality of selection parameters and receiving input from the user selecting one or more of the selection parameters to associate with the selected element, the plurality of selection parameters including at least a bindable parameter and a non-bindable parameter;
define a template structure that identifies the two or more selected elements from the sample hierarchy and identifying a corresponding access path for each identified element; and
use the template structure to access source data having a hierarchical structure corresponding to the sample hierarchy, and where the template structure defines a view of the source data corresponding to the selected elements and their associated selected elements.

20. The computer program product of claim 19, wherein the instructions operable to cause data processing apparatus to present a graphical representation of the hierarchy of elements include instructions operable to cause data processing apparatus to:
examine the sample data to define the hierarchy of elements; and
present a graphical representation of the defined hierarchy of elements to a user.

21. The computer program product of claim 19, where the instructions to display the parameter menu further comprises instructions to display a bind children only parameter and a treat as a rowset parameter.

22. The computer program product of claim 21, where receiving input selecting the bind children only parameter indicates that content associated with children of the element is accessible using the template structure while content associated with the element is not accessible.

23. The computer program product of claim 21, where receiving input selecting the treat as rowset parameter indicates that the element is treated as a rowset such that when the element occurs in the source data multiple times as a child of a same parent, then content associated with each child is accessible using the template structure.

24. The computer program product of claim 19, wherein:
the instructions operable to cause data processing apparatus to receive user input specifying a selected element include instructions operable to cause data processing apparatus to receive input identifying the non-bindable parameter, where receiving input identifying the non-bindable parameter indicates that content associated with the element is not accessible using the template structure.

25. The computer program product of claim 19, wherein:
where the instructions to display the parameter menu further comprises instructions to display a selection parameter to specify whether content corresponding to the selected element will be accessed as structured or unstructured data.

26. The computer program product of claim 19, wherein:
the instructions operable to cause data processing apparatus to receive user input selecting two or more selected elements include instructions operable to cause data processing apparatus to receive user input specifying a selection parameter for a selected element; and
the instructions operable to cause data processing apparatus to access source data include instructions operable to cause data processing apparatus to access source data according to the selection parameter.

27. The computer program product of claim 19, wherein:
the instructions operable to cause data processing apparatus to receive user input selecting two or more selected elements include instructions operable to cause data processing apparatus to receive user input identifying two or more elements to be included in the template structure; and
the instructions operable to cause data processing apparatus to define a template structure include instructions operable to cause data processing apparatus to define a template structure including the identified elements.

28. The computer program product of claim 19, wherein:
the instructions operable to cause data processing apparatus to receiving user input selecting two or more selected elements include instructions operable to cause data processing apparatus to receive user input identifying one or more elements to be excluded from the template structure; and
the instructions operable to cause data processing apparatus to define a template structure include instructions operable to cause data processing apparatus to define a template structure excluding the identified elements.

29. The computer program product of claim 19, wherein:
the instructions operable to cause data processing apparatus to access source data include instructions operable to cause data processing apparatus to generate a representation of the source data according to the template structure.

30. The computer program product of claim 29, wherein:
the representation of the source data includes a subset of the source data, the subset being defined according to the template structure.

31. The computer program product of claim 19, further comprising instructions operable to cause data processing apparatus to:
generate an electronic document incorporating the source data accessed according to the template structure.

32. The computer program product of claim 19, wherein:
the sample data includes a plurality of elements having associated tags; and
the graphical representation of the hierarchy of elements includes a representation of a hierarchy of tags associated with the elements.

33. The computer program product of claim 19, where the instructions to present a graphical representation of the sample hierarchy of elements includes displaying one or more elements that do not occur in the sample data, but are expected to occur in the source data.

34. The computer program product of claim 19, where the instructions to present a graphical representation of the sample hierarchy of elements includes displaying one or more elements that are containers without content for integrating a subset of elements in the sample hierarchy.

35. The computer program product of claim 19, where the instructions to present a graphical representation of the sample hierarchy of elements includes instructions to insert optional elements that can be activated to switch between alternative sample hierarchies for the same sample data.

36. A computer program product, tangibly embodied in an information carrier, comprising instructions operable to cause data processing apparatus to:
receive user input identifying sample data, the sample data including a plurality of elements associated with tags in a set of tags;
obtain from the sample data a hierarchy of tags;
present to a user a graphical representation of a sample hierarchy of tags, the sample hierarchy representing the hierarchical structure of tags of the sample data;
receive input from the user selecting two or more tags from the graphical representation to identify two or more selected tags from the sample hierarchy, the two or more tags being a subset of the sample hierarchy of tags and where selecting a tag includes displaying a parameter menu having a plurality of selection parameters and receiving input from the user selecting one or more of the selection parameters to associate with the selected tag, the plurality of selection parameters including at least a bindable parameter and a non-bindable parameter;
generate a template structure that identifies the two or more selected tags from the sample hierarchy of tags and identifying a corresponding access path for each identified tag;
receive user input identifying source data, the source data including elements associated with a hierarchical structure of tags corresponding to the sample hierarchy of tags; and
present a view of the source data according to the template structure, the view including one or more elements of the source data associated with tags corresponding to tags of the template structure and their associated selected elements.

37. A system, comprising:
a processor; and
a memory for storing instructions, which when executed by the processor, causes the processor to perform operations comprising:
receiving sample data having a hierarchical structure;
presenting to a user a graphical representation of a sample hierarchy of elements the sample hierarchy representing the hierarchical structure of the sample data;
receiving input from the user selecting two or more elements from the graphical representation to identify two or more selected elements from the sample hierarchy, the two or more elements being a subset of the elements in the sample hierarchy and where selecting an element includes displaying a parameter menu having a plurality of selection parameters and receiving input from the user selecting one or more of the selection parameters to associate with the selected element, the plurality of selection parameters including at least a bindable parameter and a non-bindable parameter;

defining a template structure that identifies the two or more selected elements from the sample hierarchy and identifying a corresponding access path for each identified element; and using the template structure to access source data having a hierarchical structure corresponding to the sample hierarchy, and where the template structure defines a view of the source data corresponding to the selected elements and their associated selected elements.

38. The system of claim 37, wherein presenting a graphical representation of the hierarchy of elements further comprises operations including:

examining the sample data to define the hierarchy of elements; and presenting a graphical representation of the defined hierarchy of elements to a user.

39. The system of claim 37, where displaying the parameter menu further comprises operations including displaying a bind children only parameter and a treat as rowset parameter.

40. The system of claim 39, where receiving input selecting the bind children only parameter indicates that content associated with children of the element is accessible using the template structure while content associated with the element is not accessible.

41. The system of claim 39, where receiving input selecting the treat as rowset parameter indicates that the element is treated as a rowset such that when the element occurs in the source data multiple times as a child of a same parent, then content associated with each child is accessible using the template structure.

42. The system of claim 37, where receiving input selecting the non-bindable parameter indicates that content associated with the element is not accessible using the template structure.

43. The system of claim 37, where displaying the parameter menu further comprises operations including displaying a parameter specifying whether content corresponding to the selected element is accessed as structured or unstructured data.

44. The system of claim 37, where: receiving user input selecting two or more selected elements includes receiving user input specifying a selection parameter for a selected element; and accessing source data includes accessing source data according to the selection parameter.

45. The system of claim 37, where:

receiving user input selecting two or more selected elements includes receiving user input identifying elements to be included in the template structure; and defining a template structure includes defining a template structure including the identified elements.

46. The system of claim 37, where:

receiving user input selecting two or more selected elements includes receiving user input identifying one or more elements to be excluded from the template structure; and defining a template structure includes defining a template structure excluding the identified elements.

47. The system of claim 37, further comprising operations including: generating a representation of the source data according to the template structure.

48. The system of claim 47, where:

the representation of the source data includes a subset of the source data, the subset being defined according to the template structure.

49. The system of claim 37, further comprising operations including:

generating an electronic document incorporating the source data accessed according to the template structure.

50. The system of claim 37, where:

the sample data includes a plurality of elements having associated tags; and the graphical representation of the hierarchy of elements includes a representation of a hierarchy of tags associated with the elements.

51. The system of claim 37, where presenting a graphical representation of the sample hierarchy of elements includes displaying one or more elements that do not occur in the sample data, but are expected to occur in the source data.

52. The system of claim 37, where presenting a graphical representation of the sample hierarchy of elements includes displaying one or more elements that are containers without content for integrating a subset of elements in the hierarchy.

53. The system of claim 37, where presenting a graphical representation of the sample hierarchy of elements includes inserting optional elements that can be activated to switch between alternative sample hierarchies for the same sample data.

54. A system, comprising:

a processor; and a memory for storing instructions, which when executed by the processor, causes the processor to perform operations comprising:

receiving user input identifying sample data, the sample data including a plurality of elements associated with tags in a set of tags;

obtaining from the sample data a hierarchy of tags;

presenting to a user a graphical representation of a sample hierarchy of tags, the sample hierarchy representing the hierarchical structure of tags of the sample data;

receiving input from the user selecting two or more tags from the graphical representation to identify two or more selected tags from the sample hierarchy, the two or more tags being a subset of the sample hierarchy of tags and where selecting a tag includes displaying a parameter menu having a plurality of selection parameters and receiving input from the user selecting one or more of the selection parameters to associate with the selected tag, the plurality of selection parameters including at least a bindable parameter and a non-bindable parameter;

generating a template structure that identifies the two or more selected tags from the sample hierarchy of tags and identifying a corresponding access path for each identified tag;

receiving user input identifying source data, the source data including elements associated with a hierarchical structure of tags corresponding to the sample hierarchy of tags; and presenting a view of the source data according to the template structure, the view including one or more elements of the source data associated with tags corresponding to tags of the template structure and their associated selected elements.

* * * * *

UNITED STATES PATENT AND TRADEMARK OFFICE
CERTIFICATE OF CORRECTION

PATENT NO.      : 7,428,699 B1                                    Page 1 of 1
APPLICATION NO. : 10/347113
DATED           : September 23, 2008
INVENTOR(S)     : Matthew B. Kane, Philip Levy and Jeff Young It is certified that error appears in the above-identified patent and that said Letters Patent is hereby corrected as shown below:

Claim 37:
    column 14, line 53:
        insert --,-- after "elements"

Signed and Sealed this

Tenth Day of March, 2009

JOHN DOLL
*Acting Director of the United States Patent and Trademark Office*